United States Patent [19]
Bush

[11] Patent Number: 5,133,127
[45] Date of Patent: Jul. 28, 1992

[54] BUSH CODE DUPLICATOR PARTIAL SILHOUETTE METHOD

[76] Inventor: Robert C. Bush, 206 Baugh Ave., East St. Louis, Ill. 62201

[21] Appl. No.: 602,154

[22] Filed: Oct. 25, 1990

Related U.S. Application Data

[63] Continuation-in-part of Ser. No. 20,577, Mar. 2, 1987, abandoned, and Ser. No. 204,357, Jun. 9, 1988, abandoned.

[51] Int. Cl.$^5$ .................... B23P 13/00; B23C 1/16
[52] U.S. Cl. ................................ 29/558; 76/110; 409/82
[58] Field of Search ............... 409/81, 82, 83; 76/110; 51/100 R; 29/558

[56] References Cited

U.S. PATENT DOCUMENTS

| | | | |
|---|---|---|---|
| 2,098,728 | 11/1937 | McPhee | 409/82 X |
| 3,496,636 | 2/1970 | Lieptz | 409/81 X |
| 3,791,240 | 2/1974 | Meoni | 76/110 |
| 4,117,763 | 10/1978 | Uyeda | 76/110 |
| 4,188,163 | 2/1980 | Juskevic | 409/82 |
| 4,521,142 | 6/1985 | Juskevic | 409/82 |
| 4,545,709 | 10/1985 | Feruzzi | 409/83 |

FOREIGN PATENT DOCUMENTS 133091 2/1985 European Pat. Off. .

OTHER PUBLICATIONS

Mini-Mite 008 Key Machine Instruction Manual and Part List
National Depth & Space Chart

*Primary Examiner*—William Briggs
*Attorney, Agent, or Firm*—Don W. Weber

[57] ABSTRACT

This invention relates to the method for producing a coded reference key for use in the locksmithing trade. The method comprises cutting a key blank at a first coded depth and at a first shank position, to create a partial silhouette of a reference key. Upon cutting a number of such partial reference key silhouettes at a number of positions and common depths, a set of partial reference key silhouettes can be created. When a locksmith is required to reproduce a reference key which has certain depth cuts at certain positions, he merely assembles the appropriate pre-cut partial reference keys, thereby creating the required complete silhouette. This complete reference key silhouette may then be duplicated by using a standard reference key duplicating machine.

4 Claims, 3 Drawing Sheets

BUSH CODE DUPLICATOR PARTIAL SILHOUETTE METHOD

This application is a continuation-in-part of application Ser. No. 020,577 filed Mar. 2, 1987, now abandoned, and Ser. No. 204,357 filed Jun. 9, 1988, now abandoned.

BACKGROUND OF THE INVENTION

This invention relates to the field of locksmithing and particularly to the area of masterkeys and coded reference key silhouettes.

During the normal locksmithing art, a locksmith is frequently called upon to produce a key for a particular lock without having the benefit of an original or reference key. A reference key is a key that has coded cuts which would unlock an appropriate lock and is used as a reference in making other keys on standard key-duplicating machines. If the original or a reference key is available, the locksmith can use the original or reference key to produce a duplicate key on a key cutting machine. Such machines are common in the trade, and several have been patented, (e.g. Juskevic's key cutting machine, U.S. Pat. No. 4,521,142 and Ferruzzi's Encipherment machine, U.S. Pat. No. 4,545, 709).

As shown in Juskevic, to reproduce a new key once a reference key silhouette is available, one merely clamps the reference key in a standard key-cutting device. The cutting wheel is then driven across the key-blank to reproduce the reference key silhouette on the new key. See Juskevic Column 3, lines 44-48 (guide means); column 4, lines 60-61 (key-blank); column 5, lines 1-17. These devices are in common usage throughout the United States.

The Mini-Mite Key Machine manufactured by Ilco Unican Corporation of Rocky Mount, North Carolina, manufactures a common key reproducing machine. As shown in the Mini-Mite instruction manual, a standard reference key is inserted in one vise while a key blank is inserted in a parallel vise. As the reference key moves across the stylus, the cutting wheel reproduces the reference key on the key blank. In order to use this Mini-mite key reproducing machine, one needs to have a reference key silhouette for the stylus to trace the silhouette and reproduce the new key.

When a reference or original key is not available, a locksmith must refer to a manufacturer's manual and must make coded cuts at specifically described angles and depths and in specific positions along the key-blank. (A key-blank is an uncut key from which coded cuts are made to form a duplicate key.) This reproduction by hand of these coded cuts necessitates a great deal of time and tedious effort. If a complete set of pre-cut coded reference keys were available, duplicate keys for any standard lock could be produced quickly on any key duplicating machine. However, the sheer number and storage bulk of these reference keys would make the standard process of having a reference key for every possible variation of reference cuts impractical.

Hundreds of possible reference keys would be needed to adequately stock a locksmith's shop. The current invention provides a unique method of making such reference keys available. An object of this invention is to provide a standard coded reference key silhouette in almost any instance when such reference key silhouette is needed to prepare a duplicate key for a lock. Another object of this invention is to provide a coded reference key with very few partial reference key silhouettes needed to be kept on hand, thus reducing the storage space required to duplicate standard keys.

BRIEF SUMMARY OF THE INVENTION

The novel method described herein comprises first making a number of standard partial reference key silhouettes which are then selectively combined and assembled so as to create the complete silhouette of the coded key. For example, since there are five positions on many key shanks and nine depths of cut per position, this invention requires only forty-five (45) pre-cut partial reference key silhouettes to cover such a key. Each partial reference key silhouette would have one or more depth of cuts in one or more positions. When a coded reference key is required, all that is necessary is for the locksmith to assemble the appropriate pre-cut partial reference key silhouettes thus reproducing the required silhouette. The appropriate pre-cut partial reference key silhouettes are selected according to the position/depth of cut requirements of the key desired to be reproduced. These positions and depths of cuts can be taken from the standard locksmithing manual which describes the depth of cut and position for a particular lock and key. Once the forty-five coded partial reference key silhouettes have been cut, any known coded key having five shank positions and nine depths may be reproduced by selecting the five appropriate pre-cut partial silhouettes and establishing the appropriate complete silhouette by joining the five partial silhouettes together. The key to be duplicated may then be reproduced by standard methods.

BRIEF SUMMARY OF THE DRAWINGS

FIG. 10 shows 7-7-4 depths of cut, respectively.
FIG. 11 shows 1-6-6 depths of cut, respectively.
FIG. 12 shows 1-1-7 depths of cut, respectively.
FIG. 13 shows 1-4-7 depths of cut, respectively.
FIG. 14 shows 7-1-4 depths of cut, respectively.
FIG. 15 shows 7-4-7 depths of cut, respectively.
FIG. 16 shows 1-7-7 depths of cut, respectively.
FIG. 17 shows 7-7-1 depths of cut, respectively.
FIG. 18 shows 4-4-1 depths of cut, respectively.

PREFERRED EMBODIMENT OF THE INVENTION

Figure 1:
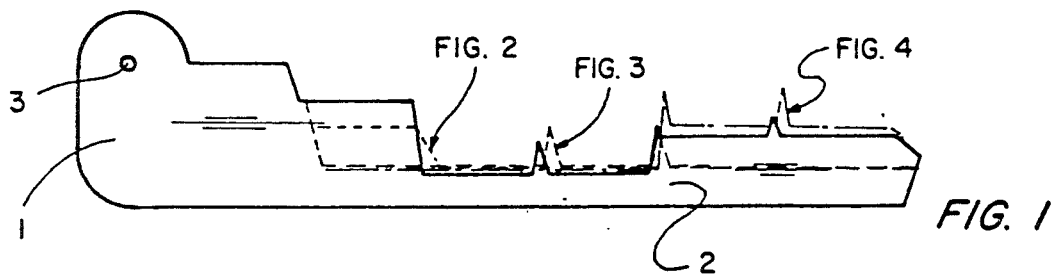
FIG. 1 shows a complete reference key silhouette with the depth of cut being 3-9-9-6-6.

The method described herein is simple, yet unique and innovative. It involves preparation of partial reference key silhouettes and assembling and securing selected partial silhouettes together to create a completed reference key silhouette. As shown in FIG. 1, a key comprises a head 1 and a shank 2. In the preferred embodiment of this invention, the partial reference key silhouettes also include a circular hole 3 in the head of each partial reference key silhouette. These holes are used to assemble and secure the various partial reference key silhouettes in place to create the complete reference key silhouette.

Figure 7:
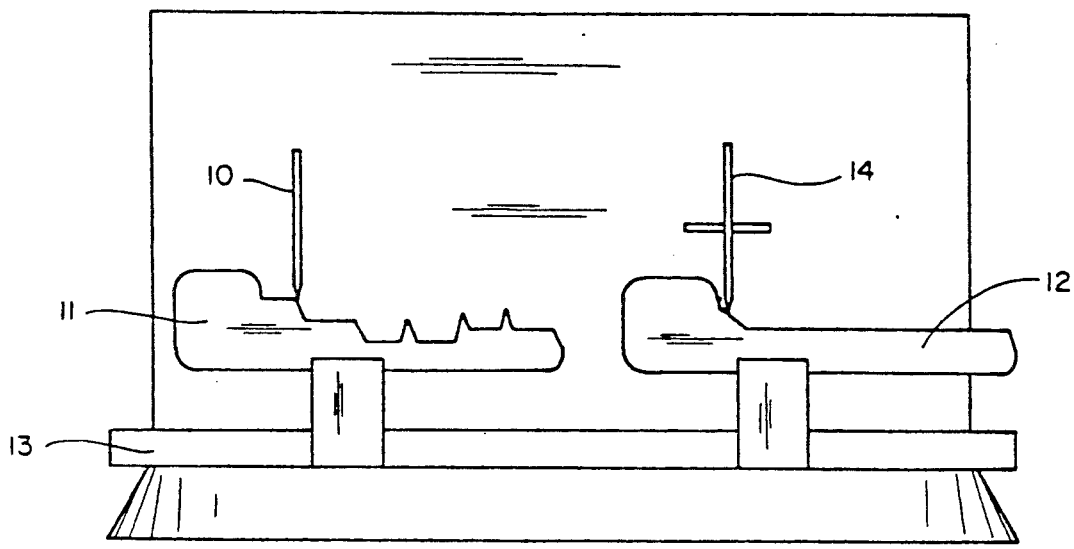

As best shown on FIG. 7, the standard key cutting device has a stylus 10 which traces a complete reference key silhouette 11. This complete reference key silhouette 11 is moved on a bar 13 which also moves the key blank 12. The key blank 12 is cut by the cutting wheel 14. The standard reference key silhouette 11 is thus reproduced on the key blank 12.

The first step in this method is to cut various depths into a number of partial reference keys at the various positions as required by manufacturers of locks. Normally, each key shank has five positions, the position closest to the head of the key being number 1 and the position on the tip of the key farthest from the head being position number 5. Each position also has nine standard depths of cut. This standard number of shank positions and depths are shown on charts well known in the trade, such as "National Depth and Space Charts." It is obvious that forty-five different partial reference keys would comprise a complete set of all standard five position/nine depth reference keys. However, many depth cuts are not used for most standard keys and some reference keys utilize several common cuts. Because a number of coded cuts are in common use, one partial reference key silhouette may contain common depth cuts at more than one common position, as shown on the partial reference key silhouettes in FIGS. 3, 4 and 8 through 18. Therefore, as few as fifteen pre-cut partial reference keys could be utilized to produce nearly eighty percent (80%) of all common coded reference keys required by manufacturer's specifications.

In order to create a complete set of reference key silhouettes, it is only necessary to prepare a pre-cut coded partial reference key for each depth and each position. As noted above, however, one partial reference key may contain more than one depth cut at more than one position. When a locksmith needs to prepare a duplicate key he merely assembles the appropriate pre-cut partial reference keys, as shown, for example in FIGS. 2, 3 and 4, to create the complete appropriate silhouette.

Figure 2:
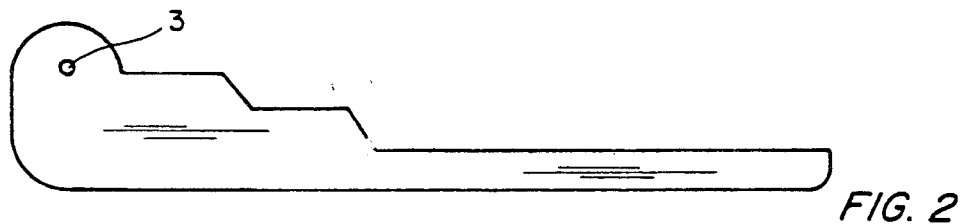
FIG. 2 shows a partial reference key silhouette with a number 3 depth of cut in the number 1 space.
Figure 3:
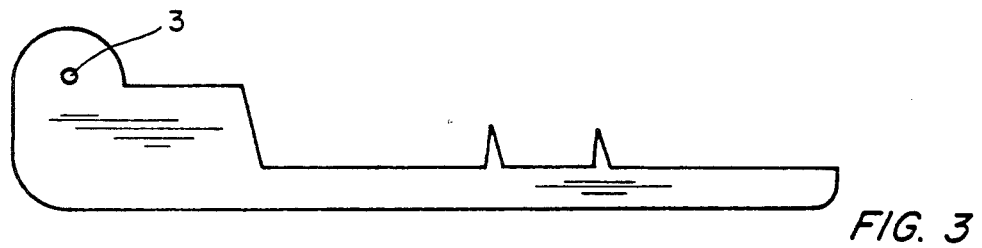
FIG. 3 shows a partial reference key silhouette with number 9 depth of cut in the number 2 and 3 positions.
Figure 4:
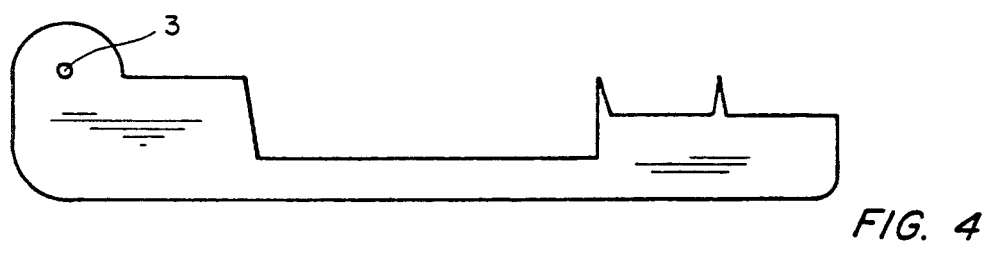
FIG. 4 shows a partial reference key silhouette with a number 6 depth of cut located in the 4 and 5 positions.
Figure 6:
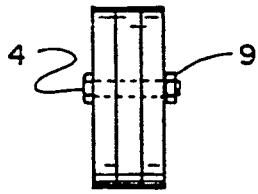
FIG. 6 shows how the completed silhouette may be secured by a nut and bolt.

Combining the partial reference key silhouettes shown in FIG. 2, 3 and 4 and bolting them together as shown in FIG. 6 would produce the full reference key silhouette shown in FIG. 1. The number 3 depth of cut in the number one space on FIG. 2, combined with the nine depth of cut in the numbers 2 and 3 positions, shown in the partial reference key of FIG. 3, would also combine with the partial reference key shown in FIG. 4 with a number 6 depth of cut located in the 4 and 5 positions, thus creating a complete reference key silhouette with the code of cuts being 3-9-9-6-6.

Nine separate depths of cut at five separate positions create 59,049 different combinations of shank positions/depths of cut ($9 \times 9 \times 9 \times 9 \times 9 = 59,049$). Only forty-five pre-cut partial reference key silhouettes could produce these 59,049 permutations. However, many depths of cut at many shank positions are not in common use. For example, a very deep depth of cut (number 9 depth of cut) at the first shank position is hardly ever found as the key shank would then be very weak. Additionally, many depths of cuts are not in common use.

Because many depths of cut are not in common use at certain key shank positions, fewer than all depths of cut at all common coded positions are required for a practical set of partial reference key silhouettes. A practical set of partial reference key silhouettes would produce nearly all, but not every possible, combination of depths at shank positions.

Figure 5:
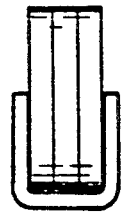
FIG. 5 is an end view showing how the various partial reference key silhouettes are secured by a clip.
Figure 8:
FIG. 8 shows a partial reference key silhouette with a number 2 depth of cut in the first space and a number 4 depth of cut in the fifth space.
Figure 9:
FIG. 9 is a partial reference key silhouette showing a number 3 depth of cut at the first and fifth shank positions.
Figure 10:
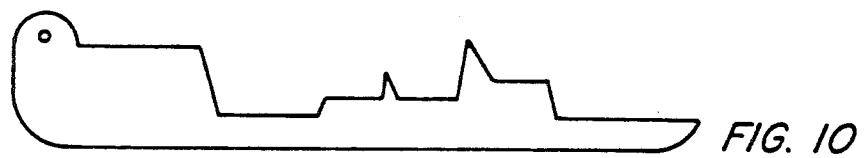
FIGS. 10 through 18 show partial reference key silhouettes with cuts made in the two, three and four positions. The depths of cuts illustrated in the two, three and four shank positions for each figure are as follows.
Figure 11:
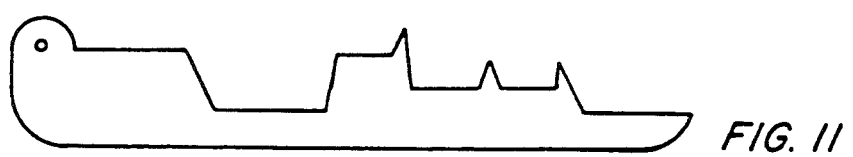
Figure 12:
Figure 13:
Figure 14:
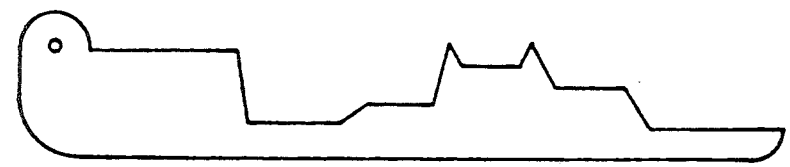
Figure 15:
Figure 16:
Figure 17:
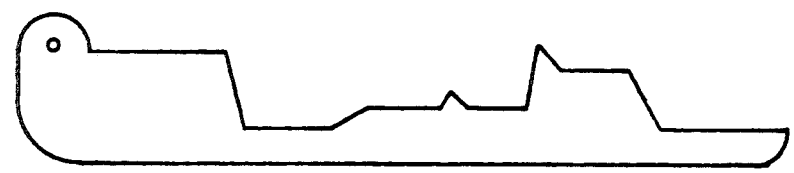
Figure 18:

Turning now to FIGS. 8 through 18, it may be shown how a coded reference key silhouette may be reproduced by selecting the appropriate partial reference key silhouettes and clasping them together as shown in FIGS. 5 or 6. FIGS. 8 and 9 show alternative base key silhouettes. FIG. 8 has a base key silhouette which has a number 2 depth of cut at the number 1 shank position and a number 4 depth of cut at the number 5 shank position. FIGS. 10 through 18 show different depths of cut at the shank positions in the center of the key shank, being positions 2, 3 and 4. Combining the partial reference key shown in FIG. 8 with the partial reference key shown in FIG. 10, produces a coded reference key with a silhouette as follows: 2-7-7-4-4. Combining the silhouette in FIG. 8 with the silhouette in FIG. 11, produces a coded reference key at 2-1-6-6-4. Combining the partial reference key in FIG. 8 with the partial reference key of FIG. 18 produces a coded key 2-4-4-1-4. Obviously, combining the base reference key shown in FIG. 8 with each of the partial reference keys shown in FIGS. 10 through 18 produces nine separate coded reference key silhouettes. We have thus used ten partial reference key silhouettes to produce nine complete coded reference key silhouettes.

Using the base reference key silhouette shown in FIG. 9 would allow us to have a number 3 depth of cut at the number 1 shank position and a number 3 depth of cut at the number 5 shank position. Combining the second base key silhouette shown in FIG. 9 with the partial reference key silhouette shown in FIG. 10 produces a key coded 3-7-7-4-3. Combining the second base key reference silhouette in FIG. 9 with the partial reference key silhouette shown in FIG. 18 produces a complete coded reference key 3-4-4-1-3. Obviously, combining the second base reference key silhouette shown in FIG. 9 individually with the partial reference key silhouettes shown in FIGS. 10 through 18 would produce another nine complete coded reference key silhouettes. We now have used eleven partial reference key silhouettes to produce eighteen completed reference key silhouettes.

Using a third base key reference silhouette, having various depths of cut at the number 1 and number 5 shank positions, and combining them with the partial reference key silhouettes having the various depths of cut shown in FIGS. 10 through 18 would produce another nine complete coded reference keys. We have now used twelve partial reference key silhouettes to produce twenty-seven fully coded reference key silhouettes.

Following the permutations as demonstrated above, it can readily be seen how a small number of partial reference key silhouettes can be combined to reproduce a large number of completed reference key silhouettes. By selectively combining a small number of partial reference key silhouettes (anywhere from two to five partial reference key silhouettes will produce a completed reference key silhouette) the appropriate coded reference key silhouette can be produced. If the code of the key required to be reproduced is known, the correct selection of the appropriate partial reference key silhouettes can produce the completed coded reference key silhouette needed to be used in the vise on the minimite machine. For example, suppose we knew the coded reference key silhouette should be 2-7-1-4-4. Combining the base reference key shown in FIG. 8 with the partial reference key shown in FIG. 14 would produce a coded reference key 2-7-1-4-4.

Once the partial reference keys are selected, they are then placed together and securely fastened by a screw 4 which is placed through the hole in the partial reference keys' heads and tightened securely by a nut. The complete silhouette as shown, for example, in FIG. 1 is thus produced. The various positions on the key shank are shown in FIG. 1. The number 2 shank position 5 and the number 3 shank position 6 and the number 4 shank position 7 are the central positions on the key shank. It is these central three positions that are used for the partial reference keys at various depths shown in FIGS. 10 through 18. The number 5 shank position 8 located furthest from the head 1 of the key blank is also shown on FIG. 1.

The bolt 4, shown in FIG. 6, may be secured by means of a nut 9. An alternative method of combining the two or more silhouettes, three partial reference keys are combined in FIG. 5, is the use of a U-clamp as shown on FIG. 5.

Having fully described my invention, I claim:

1. A method of assembling a coded reference key having pre-determined coded depths of cut at pre-determined coded positions, comprising the steps of:
   (1) cutting a first key-blank at a first coded depth of cut at a first key-blank position, thereby mechanically reproducing a partial reference key blank silhouette;
   (2) repeating Step 1 on successive key blanks for nine coded depths at five coded positions thereby mechanically reproducing a set of partial reference key blank silhouettes for each coded out at nine coded depths;
   (3) mechanically assembling and securing the appropriate pre-cut partial reference key silhouettes together wherein said securing means comprises a U-shaped clip which is attached to the bottom of the assembled partial reference key silhouettes, thereby mechanically reproducing a complete coded reference key silhouette;
   (4) mechanically reproducing the assembled and complete coded reference key silhouette by means of a standard reference key reproducing device;
   whereby a standard reference key reproducing device may be utilized when the code for the reference key is known even though the original reference key is unavailable.

2. A method of assembling a coded reference key having pre-determined coded depths of cut at pre-determined coded positions, comprising the steps of:
   (1) cutting a first key-blank at a first coded depth of cut at a first key-blank position, thereby mechanically reproducing a partial reference key blank silhouette, wherein said partial reference key comprises a head and a shank;
   (2) repeating Step 1 on successive key-blanks for nine coded depths at five coded positions thereby mechanically reproducing a set of partial reference key blank silhouettes for each coded out at nine coded depths;
   (3) mechanically assembling and securing the appropriate pre-cut partial reference key silhouettes together, wherein the head of each partial reference key silhouette has a hole therein and the securing means comprises a bolt inserted through the holes in the assembled partial reference key silhouettes and tightened by a nut, thereby mechanically reproducing a complete coded reference key silhouette;
   (4) mechanically reproducing the assembled and complete coded reference key silhouette by means of a standard reference key reproducing device;
   whereby a standard reference key reproducing device may be utilized when the code for the reference key is known even though the original reference key is unavailable.

3. A method of assembling a coded reference key as in claim 1, wherein fewer than nine pre-determined coded depths of cut at five pre-determined coded positions are mechanically reproduced in plural key blank silhouettes, thereby producing a common set of partial reference key blank silhouettes.

4. A method of assembling a coded reference key as in claim 2, wherein fewer than nine pre-determined coded depths of cut at five pre-determined coded positions are mechanically reproduced in plural key blank silhouettes, thereby producing a common set of partial reference key blank silhouettes.

* * * * *